United States Patent [19]
Miyazaki et al.

[11] 4,180,406
[45] Dec. 25, 1979

[54] POST TREATING ZINC SURFACES

[75] Inventors: Yasushi Miyazaki, Ichikawa; Masanori Suzuki; Hideaki Kaneko, both of Tokyo, all of Japan

[73] Assignee: Oxy Metal Industries Corporation, Warren, Mich.

[21] Appl. No.: 818,259

[22] Filed: Jul. 22, 1977

[51] Int. Cl.² .............................................. C09D 5/08
[52] U.S. Cl. .................................. 106/14.15; 422/15; 106/14.42; 106/14.43; 148/6.24; 252/394; 252/395
[58] Field of Search ............... 106/14, 14.15, 14.42, 106/14.43; 252/82, 83, 181, 391, 393, 394, 396, 395; 148/6.15 Z, 6.24; 21/2.7 R

[56] References Cited
U.S. PATENT DOCUMENTS

| | | | |
|---|---|---|---|
| 3,288,684 | 11/1966 | Eaton | 252/391 |
| 3,975,214 | 8/1976 | Kulick et al. | 148/6.15 Z |
| 4,054,466 | 10/1977 | King et al. | 106/14 |

*Primary Examiner*—Lorenzo B. Hayes
*Assistant Examiner*—W. Thompson
*Attorney, Agent, or Firm*—Arthur E. Kluegel; Richard P. Mueller

[57] ABSTRACT

An environmentally acceptable composition and process imparts improved corrosion resistance and paint adhesion to a conversion coated surface of zinc or zinc alloy. The coated surface is post-treated with an aqueous composition containing a thiourea compound and a vegetable tannin.

12 Claims, No Drawings

POST TREATING ZINC SURFACES

BACKGROUND OF THE INVENTION

The present invention relates to an improvement in the adhesion and corrosion resistance of painted film applied over chemical conversion coatings on zinc or alloys thereof.

It has been well known that metallic articles having a surface of zinc or zinc alloy exhibit poor paint adhesion. In order to improve the adhesion, the surface has been treated to form a phosphate coating or a complex oxide coating. It has also been well known that a chromate coating applied on the surface of zinc or zinc alloy shows high corrosion resistance but poor adhesion of painted film and poor resistance against scratching as compared with phosphate coatings. In order to improve further the corrosion resistance of phosphate conversion coatings or complex oxide coatings, such coatings have been subjected to a post-treatment process with chromic acid in which the conversion coatings are treated with chromic acid, a dichromate or salts thereof.

The post-treatment process with chromic acid is inexpensive and affords excellent corrosion resistance. However, the toxic and deleterious environmental properties of chromium compounds have recently become serious problems. In order to alleviate the dangers of chromates, it would be desirable to eliminate the use of chromate compositions without sacrificing quality.

Post-treating compositions containing no chromate include those containing predominantly phytic acid as claimed in Japanese Patent Publication No. 43406/1973, those containing predominantly alpha-aminophosphoric acid or alpha-aminosulfonic acid as claimed in Japanese Patent Publication No. 78531/1975, aqueous solutions containing free fluoride ion or a complex ion thereof as claimed in U.S. Pat. No. 3,895,970 and tannic acid as claimed in Japanese Patent Publication No. 2902/1976. The corrosion prevention of metals with tannin has been studied for some years and reported by a number of investigators, especially by E. Knowles, T. White and the like. Such reports are summerized by Journal of the Oil Colour Chemistry Association, Vol. 41, pp. 10 (1956). While some effect can be achieved by such processes, the performance on zinc and alloys thereof is poor as compared with the post-treatment process with chromic acid. The application of such post-treatments over phosphate coatings on zinc may cause some deterioration of the corrosion resistance after painting and, in particular, may cause blisters in painted film as compared to the case where no post-treatment is employed.

SUMMARY OF THE INVENTION

It has now been found that when an aqueous solution of thiourea and a vegetable tannin is applied to conversion coatings on the surface of zinc or an alloy thereof, the corrosion resistance and adhesion of the subsequently painted film is comparable to that obtained via the post-treatment process with chromic acid.

DETAILED DESCRIPTION OF THE INVENTION

Thiourea compounds useful in the present invention include thiourea itself and derivatives thereof such as alkyl thiourea, e.g., dimethyl thiourea, diethyl thiourea, etc., guanyl thiourea and the like in a concentration from 0.1 to 20 g/l, preferably from 0.5 to 5 g/l. In general, suitable for use in the invention are thiourea compounds having the general formula:

wherein each X is independently selected from the group consisting of hydrogen and alkyl and amidino groups of up to 4 carbon atoms. Substantially no effect will be achieved at a concentration of lower than 0.1 g/l. On the other hand, a concentration of higher than 20 g/l achieves no further improvement in results.

Tannin or tannic acid usable in the present invention may be any vegetable tannin, hydrolyzable or condensed, and may be partially hydrolyzed. Suitable tannins include depside tannin, gallotannin, chinese tannin, turkish tannin, hamamelitannin, tannic acid from acer ginnala, chebulinic acid, sumac tannin, chinese gallotannin, ellagitannin, catechin, catechin-tannin, and quebracho-tannic acid. The tannin may be used in a concentration from 0.1 to 20 g/l, preferably from 0.5 to 3 g/l.

The weight ratio of thiourea to tannin may range from 10:1 to 1:10, preferably from 3:1 to 1:3.

If the ratio of thiourea to tannin deviates markedly from the range of 10:1 to 1:10, blisters in subsequently painted film tend to be formed in the aqueous corrosion test.

The pH range of the treating solution according to the present process depends on the type of tannin, method and conditions of the application and the like but normally ranges from 2 to 10, preferably from 2.5 to 6.5. If the pH is higher than 10, the degradation of the tannin may occur, but if lower than 2 the reaction may occur too violently and dissolve the phosphate conversion coating. In order to adjust the pH of the treating solution, any commonly employed acidic or alkaline material may be used. Suitable acidic materials include inorganic acidic materials such as phosphoric acid, nitric acid, sulfuric acid, hydrofluoric acid, hydrochloric acid and the like and salts thereof and organic acidic materials such as oxalic acid, citric acid, malic acid, maleic acid, phthalic acid, lactic acid, tartaric acid, chloroacetic acid, acrylic acid and the like and salts thereof. Alkaline materials include inorganic and organic bases such as sodium hydroxide, potassium hydroxide, lithium hydroxide and the like, ammonia and amines such as ehtylamine, diethylamine, triethylamine, ethanolamine and the like.

For convenience in shipping, an aqueous concentrate may be prepared containing the thiourea and tannin compounds in the foregoing weight ratio with pH adjusted in the concentrate to enhance stability of the concentrate. Concentrate concentration of each component is in excess of 20 g/l, e.g., 10 wt. % or higher. For use, the concentrate is diluted with water to the desired concentration and pH adjusted, if necessary.

In general, metals subjected to this post-treatment are frequently dried without washing, but excessive soluble salts may be removed, if necessary, by washing with water.

The post-treatment solution may be applied over conversion coatings on zinc or zinc alloys by any conventional means such as spraying, immersion, brushing, roll coating, or flooding. The treatment is carried out by contacting the surface with the treating solution at a temperature of from ambient temperature to 90° C., preferably not in excess of 65° C.

The invention is illustrated by way of the following example:

EXAMPLE

Test panels of hot galvanized steel plate having a size of 100 mm×300 mm×0.3 mm and pretreated with chromic acid were polished 5 times by wet buffing to remove chromate adhered on the surface and then immersed in an aqueous solution of a surface conditioner containing titanium phosphate and passed between rubber rolls to remove excess solution. The test panels were sprayed with an aqueous zinc phosphatizing solution, washed with water, passed between rubber rolls to remove excess solution and then post-treated by immersion in an aqueous solution containing thiourea at a concentration of 2 g/l and gallotannin (available from Fuji Kagaku Kogyo Co. under the trade name of Tannic Acid AL) at a concentration of 1 g/l at 50° C. for 2 seconds, followed by passing between rubber rolls to remove excess solution and drying with hot air.

Thus treated, panels were then coated with an alkyd resin based paint via draw down bar and then baked in a hot air recycling oven at 280° C. for 50 seconds to obtain a coating thickness of about 6 microns.

Additional test panels were coated with a primer of epoxy resin and baked in a hot air recycling oven at 280° C. for 50 seconds to form a coating of about 4 microns thickness. The primed test panels were then coated with a top coating paint of acrylic resin type and then baked in a hot air recycling oven at 280° C. for 60 seconds to form a double coating having a total thickness of 14 microns.

The adhesion of the painted films was tested by the bending test in which two test pieces were bended to 180° and then folded completely by means of a vise and then applying and removing rapidly a cellophane tape and the results were then rated from 5 to 1.

Criterion for rating results of bending test were as follows:
5: No stripping
4: Not more than 5% stripping
3: Not more than 25% stripping
2: Not more than 50% stripping
1: More than 50% stripping The salt-spray corrosion test was performed by scribing the test pieces to the depth to the base metal by means of a knife and then subjecting the panels to the salt spray test according to JIS-Z-2371 for 240 hours for the test panels coated with the single layer paint and for 1000 hours for the test pieces coated with two layers. After washing with water and drying, cellophane tape was applied and removed rapidly from the scribed portion of each test panel to measure the maximum width stripped off from the surface in mm and to observe the stripping-off of the painted film due to blisters in the film.

The aqueous corrosion test was performed by immersing the test panels into boiling water for 2 hours. Blisters were observed and the test panels rated by the bending test.

Blisters are rated as follows:
10—None
5—Blisters on a portion of the panel surface
0—Blisters on the entire panel surface.

COMPARATIVE EXAMPLES

For comparison purposes, panels were treated in an identical manner as above except for the post-treatment step.

Comparative Example 1A employed an aqueous solution of thiourea in a concentration of 2 g/l, Example 1B, an aqueous solution of gallotannin (available from Fuji Kagaku Kogyo Co. under the trade name of Tannin Acid AL) in a concentration of 2 g/l, Example 1C, a conventional aqueous solution of chromic acid at a concentration of 18 g/l, and Example 1D omitted the post-treatment entirely.

Results are presented in the Table.

TABLE

| EXAMPLE | Single Layer Paint 240 Hr. Salt Spray | | | Two Layer Paint | | 1000 Hr. Salt Spray (mm) |
|---------|---|---|---|---|---|---|
| | Blisters | Corrosion Width (mm) | Bending | Aqueous Corrosion | | |
| | | | | Blisters | Bending | |
| 1 | 10 | 0–0.5 | 4 | 10 | 4 | 0–1 |
| 1A | 5 | 3 | 2 | 5 | 2 | 4 |
| 1B | 5 | 3 | 2 | 5 | 2 | 3 |
| 1C | 10 | 0–0.5 | 3–4 | 10 | 4 | 0–1 |
| 1D | 0 | 5 | 2 | 0 | 2 | 5 |

As apparent from the data in the Table, the results obtained by the present process are comparable with those obtained by the conventional chromate process, except that the adhesion result obtained by the present process is somewhat superior to that obtained by the conventional process. Thus it is appreciated that the process according to the present invention can enhance the resolution of environmental pollution by replacing the conventional process employing chromic acid.

What is claimed is:

1. An aqueous composition useful in the post-treatment of zinc or zinc alloy surfaces having a zinc phosphate conversion coating thereon comprising a thiourea compound and a vegetable tannin compound in a weight ratio of thiourea compound:vegetable tannin compound in the range of 10:1 to 1:10.

2. The composition of claim 1 wherein the concentration of the thiourea compound and the vegetable tannin are each in excess of 20 g/l.

3. The composition of claim 2 wherein the concentrations are each in excess of 10 wt. %.

4. The composition of claim 1 wherein the weight ratio is in the range of 3:1 to 1:3.

5. The composition of claim 1 wherein the thiourea compound is present in a concentration of from 0.1 to 20 g/l and the vegetable tannin is present in a concentration of from 0.1 to 20 g/l.

6. The composition of claim 5 wherein the thiourea compound is present in a concentration of from 0.5 to 5 g/l and the vegetable tannin is present in a concentration of from 0.5 to 3 g/l.

7. The composition of claim 5 exhibiting a pH value of from 2 to 10.

8. The composition of claim 7 exhibiting a pH value of from 2.5 to 6.5.

9. The composition of claim 1 wherein the thiourea compound has the formula:

wherein each X is independently selected from the group consisting of hydrogen, and alkyl and amidino groups of up to 4 carbon atoms.

10. The composition of claim 9 wherein the thiourea compound is selected from the group consisting of thiourea, dimethylthiourea, diethylthiourea and guanylthiourea.

11. The composition of claim 1 wherein the vegetable tannin is gallotannin.

12. A process for post-treating a zinc surface having a zinc phosphate conversion coating thereon comprising contacting the surface with the composition of claim 5 at a temperature of from ambient to 90° C.

* * * * *